United States Patent [19]

Bryce

[11] Patent Number: 4,617,458

[45] Date of Patent: Oct. 14, 1986

[54] COUNTERFEIT DETECTION CIRCUIT

[75] Inventor: David R. Bryce, Morrisville, Pa.

[73] Assignee: Brandt, Inc., Bensalem, Pa.

[21] Appl. No.: 700,048

[22] Filed: Feb. 11, 1985

[51] Int. Cl.[4] .............................................. G06K 7/08

[52] U.S. Cl. .................................... 235/449; 235/493; 235/451

[58] Field of Search ........................ 235/449, 493, 451

[56] References Cited

U.S. PATENT DOCUMENTS 4,114,804 9/1978 Brosow .......................... 235/449 X

*Primary Examiner*—Harold I. Pitts

*Attorney, Agent, or Firm*—Louis Weinstein

[57] ABSTRACT

A magnetic detection circuit in which the sensor signal is integrated over the length of the examined sheet and compared with a pair of reference levels to establish the presence of too much or too little magnetizable material. The integration technique assures proper operation in spite of changes in feed rate.

12 Claims, 1 Drawing Figure

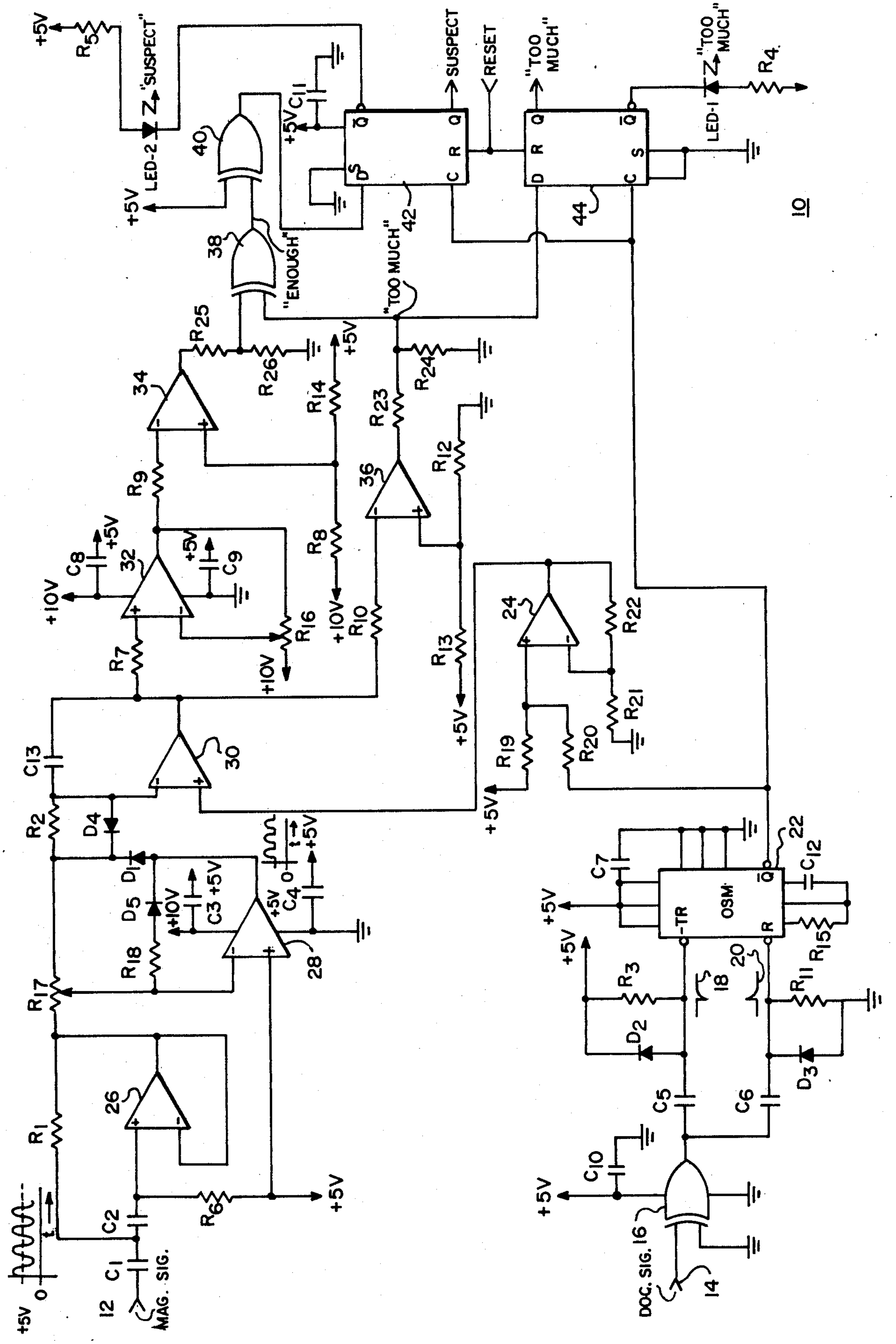
"SUSPECT"
LED-2
SUSPECT
RESET
"TOO MUCH"
LED-1
"ENOUGH"
"TOO MUCH"
OSM
MAG. SIG.
DOC. SIG.
10

COUNTERFEIT DETECTION CIRCUIT

FIELD OF THE INVENTION

The present invention relates to a counterfeit detection circuit and more particularly to a novel circuit for detecting counterfeit bills and the like and which integrates the detected signal to provide detection over a wider range of bill speeds.

BACKGROUND OF THE INVENTION

Counterfeit detection apparatus is typically utilized to determine the genuiness of paper money and the like. For example, certain regions of U.S. paper currency are printed with an ink containing magnetizable particles. Counterfeit currency typically does not use such ink. Alternatively in some instances counterfeit currency utilizes too great an amount of magnetic particles or alternatively utilizes a reproduction technique in which toner material which is similar to that used in photocopier machines and having a high concentration of magnetic particles is used to produce the currency.

One detection technique presently in use is described in U.S. Pat. No. 4,114,804 and comprises a permanent magnet member and a magnetic sensor and associated circuitry, which elements are integrated into a high speed currency counter. A stack of bills are placed in the currency counter infeed hopper. When the apparatus is turned on, the paper currency is bottom fed one sheet at a time through a combined feed/stripper assembly. Each bill passes through the magnetic field created by the permanent magnet, causing those ferro-magnetic particles on the bill which pass through the magnetic field to be magnetized. The magnetized particles which pass the sensor cause the generation of an electric signal which fluctuates as a function of magnetic field strength. The generated signal is typically non-uniform due to the rather random distribution of the ferromagnetic particles on the bill, but is generally characterized as an alternating or a.c.-type signal.

The signal generated by the sensor is rectified and is compared against a reference level signal. The circuitry associated with the sensor halts the currency counting operation in the event that the detected signal fails to reach the predetermined threshold. So long as the detected signal exceeds the predetermined threshold, the counting operation continues undisturbed.

The gap between each single fed bill is utilized by the counting apparatus for counting purpose and is also utilized to initiate a halting operation when the trailing edge of a bill passes the magnetic sensor.

In order to enhance the sensitivity and accuracy of the detection operation, this inventor developed a circuit described in U.S. patent application Ser. No. 524,856 filed Aug. 19, 1983. The improved circuitry described in the aforementioned pending patent application utilizes a sensing means for sensing the presence of a magnetic field, which sensing means further comprises an integral band pass circuit which passes only those detected signal lying within a narrow predetermined pass band. The signal lying within the pass band is rectified and compared against a reference level. The result of the comparison is temporarily stored in binary form, one binary state representing a good bill and the remaining binary state representing a suspect bill. When the trailing edge of the bill just examined passes the magnetic sensor, the stored condition is examined to generate a signal representative of the type of bill examined.

Although the above-mentioned counterfeit detection apparatus operated satisfactorily, it is desirable to provide counterfeit detection apparatus having greater sensitivity and reliability for use in currency counting apparatus having a wide range of operating speeds.

DESCRIPTION OF THE INVENTION

The present invention provides a counterfeit detection circuit which is characterized by providing adjustable signal amplification means and integration means which enhance the sensitivity and reliability of the counterfeit detection circuit over a wide range of sheet counting needs.

A high pass filter passes only those signals generated by the magnetic sensor which suppresses low frequency noise. The passed signal is supplied to a rectifier which includes a variable gain amplifier whose gain is controlled by an adjustable potentiometer. The circuit also rectifies the signal according to the selectable DC level.

The rectified signal is applied to an integrator which develops a descending ramp signal whose depth is a measure of the integrated amount of signal that exceeds an adjustable threshold level applied to one input of the integrator. The amount of signal is the product of both signal amplitude and time. The integrated signal is compared against two thresholds respectively representing the upper and lower limits of an acceptable amount of ferromagnetic material. When the trailing edge of the bill presently being sensed by the magnetic sensor passes the magnetic sensor the output of the integrator is compared against the aforementioned lower and upper limits. If the integrated signal is above the upper limit a "too much" signal is temporarily stored indicating the presence of stronger magnetic properties than genuine U.S. currency. If the signal is below the threshold representing the lower limit, a suspect condition is temporarily stored at a second memory location. If the output level of the integrator is between the two thresholds this signal condition is not stored and the counting operation is permitted to continue in normal fashion.

Both memory locations are sampled and if either stores a binary condition representative of either the "too much" or "suspect" condition, the counting operation will be abruptly halted. The presence of these conditions also provide visual indications by causing energization of an LED or the like, there being a visual indicator associated with each condition.

OBJECTS OF THE INVENTION AND BRIEF DESCRIPTION OF THE FIGURES

One object of the present invention is to provide a novel counterfeit detection circuit having increased sensitivity as compared with conventional apparatus.

Another object of the present invention is to provide a novel counterfeit detection circuit which provides increased sensitivity in currency counting apparatus operable over a broad range of operating speeds.

Still another object of the present invention is to provide a novel counterfeit detection circuit in which signals generated due to the presence of magnetizable particles undergo integration in order to develop a signal which takes into account both amplitude and time to thereby enhance the sensitivity of the detection circuitry independently of the operative speed.

The above as well as other objects of the present invention will become apparent when reading the accompanying description and drawings in which:

The sole FIGURE is a circuit diagram of a counterfeit detection circuit embodying the principals of the present invention.

DETAILED DESCRIPTION OF THE INVENTION

The counterfeit detection circuit 10 shown in the FIGURE is comprised of input 12 for receiving an output signal from the magnetic sensor shown for example in FIG. 1*c* of aforementioned U.S. Pat. No. 4,114,804. As shown therein, the individual sheets of paper currency are moved through a sheet handling and counting machine which advances sheets one at a time from an input stack, detects the genuineness of the sheets at the same time that the sheets are being counted and deposits the counted sheets in an output stacker. Each sheet passes through a magnetic field created by a permanent magnetic member, for example, 75. A sensor 76 in alignment with the permanent magnet member 75 detects the presence of a magnetic field or a change in magnetic field due to the presence of magnetizable particles on the bill. Although the permanent magnet 75 is shown as being a spaced distance from sensor 76, the permanent magnet may be positioned further away from or closer to the sensor and in fact may be positioned at the same location as the sensor 76 and on the opposite sides of the path of movement of sheets, for example.

The signal developed by the sensor is coupled to input 12 and is hereinafter referred to as "MAGSIG". The signal MAGSIG is normally an AC-type signal superimposed upon a DC level.

The sheet detector 20 shown in FIG. 1*c* of U.S. Pat. No. 4,114,804 is utilized in cooperation with a light source 19 shown in FIG. 1 for detecting the presence of sheets. This signal hereinafter referred to "DOCSIG" is a logic-level signal which goes low when a sheet is passing by the magnetic pick-up head. The signal is applied to logic gate 16 which functions as a non-inverting buffer. The output of buffer 16 is simultaneously applied to falling and rising edge detectors respectively comprised of elements C5, R3, D2 and C6, R11, D3. The changing levels 18 and 20 produced by the falling and rising edge detectors are respectively applied to the trigger and reset inputs of a one-shot multi-vibrator 22 for respectively triggering and resetting the one-shot multi-vibrator.

The $\overline{Q}$ output of one-shot multi-vibrator (OSM) 22 goes low, i.e. is triggered, as DOCSIG goes low and the $\overline{Q}$ output goes high, i.e. is reset, either as DOCSIG goes high or when the one-shot 22 times out. The reset period for one-shot multi-vibrator 22 is preferrably set to a maximum of 60 milliseconds by R15 and C16.

The time that the $\overline{Q}$ signal is low represents the time during which MAGSIG is measured. The rising edge of the $\overline{Q}$ output is utilized to lock the measured value into one of the bi-stable flip-flop registers 42 or 44 in a manner to be more fully described.

The MAGSIG signal, as was mentioned hereinabove, may be considered to be an AC signal at a frequency of approximately 1.16 kHz, superimposed upon a +5 volt offset. The signal MAGSIG is applied to a high pass filter comprised of circuit elements R1, R6, C1, C2 and operational amplifier 26. The high pass filter has a −3 dB point at about 1.0 kHz. The high pass filter suppresses any lower frequency noise that may have been introduced between the magnetic pick-up head (i.e. sensor) and the high pass filter.

The filtered signal is applied to a variable gain precision half-wave rectifier comprised of circuit elements R17, R18, D1, D5 and operational amplifier 28. The filtered MAGSIG signal is applied to the inverting input of operational amplifier 28 and is rectified with respect to the voltage applied to the non-inverting input. The output signal developed by the precision rectifier comprises the positive signal halves of MAGSIG with a +5 volt DC offset, or the same offset as the incoming MAGSIG signal.

The rectified signal is applied to one side of an integrator comprised of circuit elements R2, D4, C13 and operational amplifier 30. The rectified signal is applied to the inverting input of operational amplifier. The other input to the integrator is the output of an adder circuit comprised of circuit elements R19 through R22 and operational amplifier 24. The adder circuit sums DOCSIG (after one shot multi-vibrator 22) with a +5 volt DC level, these signal levels being applied to the non-inverting input of operational amplifier 24 through resistors R19 and R20, respectively. The output of the adder circuit is +5 volts DC during the document sensing time and rises to nearly +10 volts DC during the no document time. The output of the integrator circuit, which is developed at the output of operational amplifier 30, is a descending ramp signal, the depth of which is a measure of the amount of signal at the inverting input of operational amplifier 30 that exceeds +5 volts DC. The "amount of signal" is to be understood as a product of both the signal amplitude and time. For example, a high amplitude signal persisting for a short period of time will produce the same ramp depth as a low amplitude signal that persists for a longer time.

The above conditions occur when a bill is moved by the magnetic pick-up head (preferrably at the coil type) at different speeds. At a high operating speed, the document sensing time is short, but the signal amplitude is quite high. At a slower speed operating speed, the document sensing time is longer while the signal amplitude is reduced. The amplitude of MAGSIG varies as the bill speed varies because MAGSIG is a measure of the change in magnetic flux per unit time. As a bill moves quickly by the pick-up head, any variation in flux must occur over a short time. The resulting peak instantaneous voltage will be quite high. At slower operating speeds, the change in flux per unit time is smaller and MAGSIG reflects this with a lower peak signal amplitude. Mathematically, the instantaneous value of MAGSIG is:

$$V=-N(d\phi/dt)$$

Where

V=the instantaneous value of MAGSIG,

N=a constant related to the magnetic pickup head, $\phi$=magentic flux sensed by the magnetic pickup head, and t=time.

The integral of the instantaneous voltage value, as represented by the voltage drop appearing at the output of operational amplifier 30 is $-N\phi$ $$\Big|_{t=o}^{t=\alpha}$$

where $$\Big|_{t=o}^{t=\alpha}$$

represents the time interval from the start of the document sensing time (t=o) to the end of the document sensing time (t=α). This indicates that the integrated MAGSIG is proportional to the total amount of magnetic flux sensed. At the end of the document passage time, the voltage level at the output of the integrator (i.e. operational amplifier 30) will have descended by an amount corresponding to the total flux detected on the bill by the pick-up head.

If this voltage drops below the threshold set at the non-inverting input of comparator 36, the "TOO MUCH" line goes high which indicates that the bill being examined has a far greater amount of magnetic flux than is encountered on genuine U.S. currency.

The integrator output appearing at the output of operational amplifier 30 is also amplified by an amplifier circuit comprised of operational amplifier 32 and circuit components R7, R9, R16. The amplified signal is applied to the inverting input of comparator (i.e. operational amplifier) 34, a reference level being applied to its non-inverting input. If the ramp developed by thee integrator circuit has not descended far enough to cross this threshold the "ENOUGH" line stays low indicating that the bill that has been examined has developed far less magnetic flux than normal U.S. currency. Normal U.S. currency will cause the "ENOUGH" line to go high and will cause the "TOO MUCH" line to go low at the end of a bill sensing time. Any other possible condition (i.e. "ENOUGH" and "TOO MUCH") both low or both high will cause the output of logic gate 38 to go low, causing the output of logic gate 40 to go high. The high signal is applied to the D input of bistable flip-flop 42, causing the $\overline{Q}$ output of go low thereby energizing LED-2 to provide a visual indication of the suspect condition. The Q output of bistable flip-flop 42 is utilized to generate a halt signal for abruptly halting the counting operation, typically by activating an electromagnetic clutch for disengaging motor drive from the sheet feeding mechanism and for activating an electromagnetic brake for abruptly halting the feeding mechanism rollers and the like.

The suspect signal is generated by application of the $\overline{Q}$ output signal of one shot multi-vibrator 22 to the clock input of bistable flip-flop 42. The clocking occurs on a positive going signal which occurs when the trailing edge of the bill being examined passes the bill sensor, which is typically a light sensing element such as a photodiode or phototransistor.

The $\overline{Q}$ output of one-shot multi-vibrator 22 is also coupled to the clock input of C of bistable flip-flop 44. When the "TOO MUCH" signal is high, indicating a far greater amount of magnetic flux than normally encountered when examining genuine U.S. currency, this condition is clocked into bistable flip-flop 44 causing the $\overline{Q}$ output to go low, illuminating LED-1 to provide a visual indication of the "TOO MUCH" condition. The Q output of flip-flop 44 is utilized to halt the feed mechanism in the same manner as the Q output of bistable flip-flop 42.

Bistable flip-flops 42 and 44 are reset by application of a reset signal to the reset input terminals R of the bistable flip-flops. The signal may for example be applied to the bistable flip-flops upon restart of the counting operation.

In the event that the trailing edge of a bill occurs more than 60 milliseconds after its leading edge (for example due to the presence of a "long" bill which may actually be two overlapping bills) a clocking signal is developed at the $\overline{Q}$ output of one-shot multi-vibrator 22.

In the event that the descending ramp signal developed by the integrator circuit is between the two thresholds appearing respectively at the inverting inputs of comparators 34 and 36, the counting operation continues without interruption.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. Apparatus for evaluating paper currency for genuiness, said paper currency moving one bill at a time at spaced intervals along a feed path and being passed through a magnetic field while moving along said feed path, said apparatus comprising:

- sensing means adjacent the feed path for detecting the presence of particles on the bill affected by said magnetic field for generating a detection signal due the presence of the aforementioned particles;
- filter means for passing only those frequencies of the detection signal above a predetermined frequency value;
- means for rectifying the signal outputted by said filter means;
- bill detection means arranged along the feed path for sensing the presence of a bill to generate a bill presence signal have a first state representing the presence of a bill adjacent to the bill detection sensor and having a second state representing the absence of a bill adjacent to bill detection sensors;
- means responsive to the bill presence signal for generating a reference signal having a first constant level responsive to the presence of the first state and a second constant level responsive to the presence of the second state of said bill presence signal;
- means for integrating the rectified signal developed at the output of said rectifying means;
- means for comparing the integrated signal against said reference level signal to develop a ramp signal which deviates from the level of the reference level signal as a function of the amount of magnetic flux detected during the detection interval; and
- first means for comparing the ramp signal against a fixed threshold when the bill presence signal changes from said first to said second state for generating a suspect signal when the total value of magnetic flux detected is less than the amount normally encountered for a genuine bill.

2. The apparatus of claim 1 further comprising means for temporarily storing the result of the comparison by said comparing means.

3. The apparatus of claim 1 further comprising second means for comparing the ramp signal against a second fixed threshold level when the bill presence signal changes from said first to said second state for generating a second support signal when the total amount of magnetic flux detected is greater than the amount normally encountered in genuine paper currency.

4. The apparatus of claim 3 further comprising additional storing means for temporarily storing the result of the second comparison by said second comparing means.

5. The apparatus of claim 1 wherein said reference signal generating means further comprises means for changing the reference level signal from said first state to said second state at a predetermined time interval after the reference level signal has changed to the first state regardless of the time occurrence of the change of said present signal from said first to said second state.

6. The apparatus of claim 5 wherein said means for altering the reference level signal comprises a one-shot multi-vibrator.

7. The apparatus of claim 1 wherein the signal developed by said magnetic sensing means is an alternating signal offset by a predetermined DC value;

said rectifier means comprising means for rectifying the AC type signal passed by said filter means about an offset level substantially equal to the aforementioned offset value.

8. The apparatus of claim 1 wherein said filter means comprises a bypass filter having a −3 dB point located at approximately 1.0 kHz for suppressing any low frequency noise which may be introduced into the sensor signal.

9. The apparatus of claim 1 further comprising adder means for summing the output of said reference signal generating means with a predetermined constant voltage level;

said integrating means further comprising comparator means for comparing the integrated signal with the output of said adder means.

10. The apparatus of claim 3 further comprising logical gating means for generating a suspect signal whenever the total amount of magnetic flux detected is either less than the lower limit or greater than the upper limit.

11. The apparatus of claim 1 further comprising falling and rising edge detectors having their inputs coupled in common to receive the bill presence signal and having their outputs respectively coupled to the trigger and reset inputs of said one-shot multi-vibrator.

12. The apparatus of claim 1 wherein said first comparison means comprises an operational amplifier having a first input for receiving the integrated signal and a second input coupled to reference level means.

* * * * *

UNITED STATES PATENT AND TRADEMARK OFFICE

CERTIFICATE OF CORRECTION

PATENT NO. : 4,617,458

DATED : October 14, 1986

INVENTOR(S) : David R. Bryce

It is certified that error appears in the above-identified patent and that said Letters Patent is hereby corrected as shown below:

Column 7, line 3, "support" should read -- suspect --.

Signed and Sealed this

Sixth Day of January, 1987

*Attest:*

DONALD J. QUIGG

*Attesting Officer* *Commissioner of Patents and Trademarks*